P. H. FELLOWS.
Pruning Implement.
No. 212,137. Patented Feb. 11, 1879.
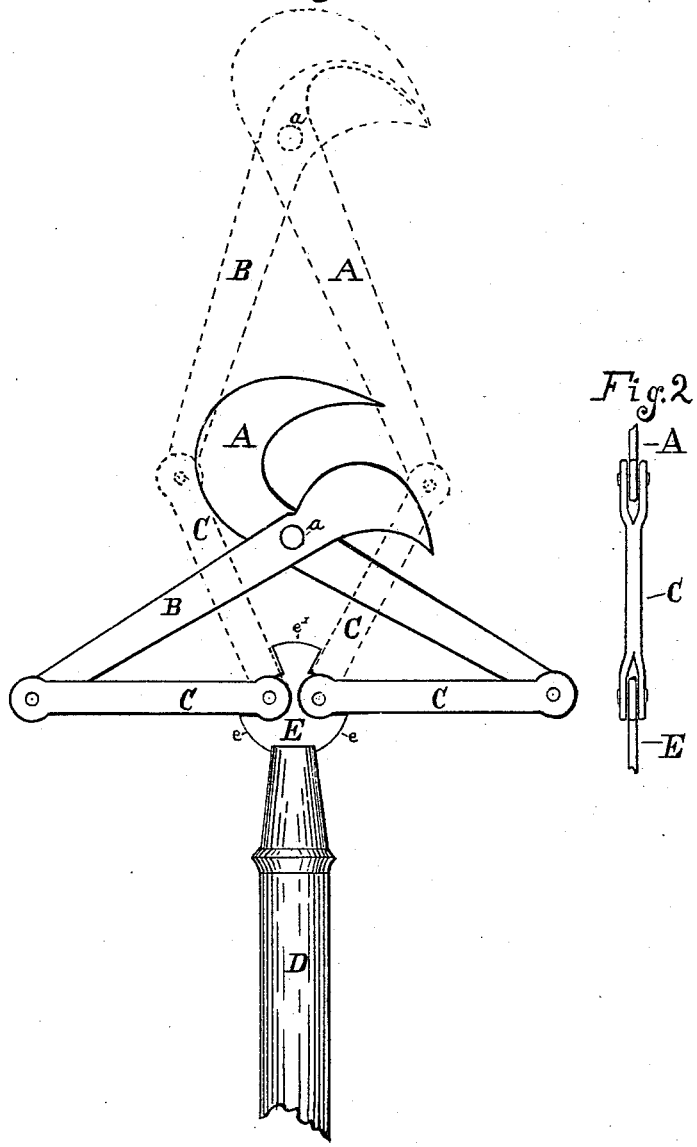
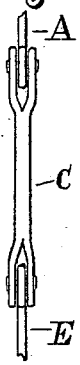
WITNESSES.  
INVENTOR.

UNITED STATES PATENT OFFICE.

PRICE H. FELLOWS, OF KOKOMO, INDIANA.

IMPROVEMENT IN PRUNING IMPLEMENTS.

Specification forming part of Letters Patent No. 212,137, dated February 11, 1879; application filed October 14, 1878.

*To all whom it may concern:*

Be it known that I, PRICE H. FELLOWS, of the city of Kokomo, county of Howard, and State of Indiana, have invented certain new and useful Improvements in Pruning-Hooks, which are fully described in the following specification, and pointed out in the claim.

Reference is had to the accompanying drawings, which are made a part hereof, and on which similar letters of reference indicate similar parts.

Figure 1 is a view of a pair of pruning-shears, as seen from one side, embodying my invention. The whole lines show the position of the several parts when the shears are open and ready for work, and the dotted lines represent them when closed, or as they appear after having been operated. Fig. 2 is an edge view of the rod C, showing the joints which it forms with the other parts.

In said drawings, those portions marked A represent the longer of the two knives which form the shears and its shank; B, the other knife; C C, rods or bars which connect the shanks of the knives to the handle; D, a handle, which is intended to be of sufficient length that the operator may remain on the ground while using the shears; and E, a metal piece formed with a tang to enter the handle, and having its projecting part so formed that the rods C C may be suitably attached thereto. This part E has two ears, $e\ e$, to prevent the rods C C from falling too far in opening the shears. There also extends upwardly from this part E a projection, $e'$, which serves the important purpose of preventing the two blades of the shears from passing each other too far, and which also prevents them from tumbling about to the extent that they otherwise would. I preferably form this projection as shown, so as to just fill the space between the lower portions of the bars C C when the knives are closed; but so long as it accomplishes the specified object its shape and size are not imperative.

I find it desirable to have the cutting part of the shears as near directly over the pivot $a$ as possible. I also find that while, of course, most of the bevel should be on the outer sides of the knives, it is best to slightly bevel their inner sides, so that they will not draw together, and thus break or dull each other in cutting.

In operation, my shears are raised up, when their weight causes them to fall open. The knife A is then hooked over the limb to be removed from the tree, and a simple pull on the handle of the requisite force causes the shears to close and sever whatever is between them.

Having thus fully described my said invention, what I claim as new, and desire to secure by Letters Patent, is—

In a pruning implement composed of the knives A B, rods C C, handle D, and part E, and in which the knives are operated by pulling downward upon the handle, the ears $e\ e$ and projection $e'$ on the part E, substantially as and for the purposes set forth.

In witness whereof I have hereunto set my hand and seal, at Indianapolis, Indiana, this 10th day of October, A. D. 1878.

PRICE H. FELLOWS.

In presence of—
C. BRADFORD,
WM. J. MILLNER.